United States Patent [19]

Shimizu et al.

[11] Patent Number: 4,666,949

[45] Date of Patent: May 19, 1987

[54] THERMOCHROMIC POLYURETHANE FOAM

[75] Inventors: Goro Shimizu, Ohtsu; Yoshimi Hayashi, Kyoto; Hajime Hasegawa, Chigasaki; Taiji Koga, Yokohama; Atsuo Takei, Fujisawa; Tohru Okuyama, Sagamihara; Hideo Torigoe, Kobe, all of Japan

[73] Assignees: Matsui Shikiso Chemical Co., Ltd.; Bridgestone Corporation, both of Japan

[21] Appl. No.: 825,076

[22] Filed: Jan. 31, 1986

[51] Int. Cl.⁴ ............................................. C08G 18/14
[52] U.S. Cl. ................................. 521/114; 521/124; 521/125; 521/126; 521/128; 521/129; 521/130
[58] Field of Search ............... 521/114, 124, 125, 126, 521/128, 129, 130

[56] References Cited

U.S. PATENT DOCUMENTS

| | | | |
|---|---|---|---|
| 3,539,375 | 11/1970 | Baum | 346/214 |
| 3,560,229 | 2/1971 | Farnham et al. | 106/21 |
| 3,705,037 | 12/1972 | Inoue et al. | 430/339 |
| 3,741,628 | 6/1973 | Margerum | 350/354 |
| 4,028,118 | 6/1977 | Nakasuji | 106/21 |
| 4,054,684 | 10/1977 | Ceintrey et al. | 106/21 |
| 4,086,054 | 4/1978 | Seibert et al. | 8/661 |
| 4,341,565 | 7/1982 | Martenson | 106/307 |
| 4,421,560 | 12/1983 | Kito et al. | 106/21 |
| 4,425,161 | 1/1984 | Shibahashi et al. | 106/21 |
| 4,501,876 | 2/1985 | Zahr | 528/266 |
| 4,502,066 | 2/1985 | Satake et al. | 427/150 |

FOREIGN PATENT DOCUMENTS 1405701  9/1975  United Kingdom .
2093055  8/1982  United Kingdom .

*Primary Examiner*—Maurice J. Welsh
*Attorney, Agent, or Firm*—McGlew and Tuttle

[57] ABSTRACT

A thermochromatic polyurethane foam comprising a polyol and a polyisocyanate as main components, and a thermochromic composition serving as a coloring agent and added to the main components singly or conjointly with a usual dye or pigment. The thermochromic composition comprises an electron-donating chromogenic material, an acidic substance and a solvent.

13 Claims, No Drawings

THERMOCHROMIC POLYURETHANE FOAM

FIELD AND BACKGROUND OF THE INVENTION

The present invention relates to a novel polyurethane form having thermochromic properties and useful for toys, ornaments, bathing articles, kitchen utensils, industrial materials, etc. to give them a kind of temperature sensor function.

Many kinds of foams are commercially available. Of these, polyurethane foams are widely used for bedding, furniture, tools, vehicles, etc. as cushion materials, for buildings, machines, household electric appliances, etc. as heat-insulating materials, and also for toys, toiletware, sundries, etc. as water absorbing materials. These foams are colored as desired with usual dyes or pigments.

The polyurethane foam commercially used for toys, toiletware, sundries, etc. is in the form of cut pieces having the foam structure itself and is characterized in that it can be physically given various shapes. However, as far as colors are concerned, such a piece is merely given the color of a dye or pigment usually used as a coloring agent. Accordingly, if a commercial article is adapted to detect a change in the ambient temperature to exhibit a particular color in accordance with the change, for example, if a kitchen utensil is adapted to undergo a color change upon sensing temperature for the user to visually observe the temperature of hot water, the material so adapted will find important industrial use, but such polyurethane foam has not been disclosed.

SUMMARY OF THE INVENTION

In view of the above situation, the present inventors intend to provide a novel polyurethane foam having highly sensitive thermochromic properties and retaining the characteristics of urethane foam using existing foaming equipment, from a polyol and polyisocyanate serving as the main component and various known additives such as catalyst, foam stabilizer, extender pigment, plasticizer, blowing agent, solvent and water, with use of a thermochromic composition, especially such a composition enclosed in microcapsules, singly or conjointly with a usual dye or pigment, so as to remarkably increase the usefulness of polyurethane foam.

The thermochromic polyurethane foam of this invention is characterized in that it comprises a polyol and a polyisocyanate serving as the main components, and a thermochromic composition serving as a coloring agent and added to the main components singly or conjointly with a usual dye or pigment, the thermochromic composition being composed of three components, i.e., an electron-donating chromogenic material, an acidic substance and a solvent.

When the three components of the thermochromic composition, i.e., the electron-donating chromogenic material, acidic substance and solvent, are conjointly present as enclosed in microcapsules, the three components can be combined effectively, hence desirable.

When a 1,2,3-triazole is used as the acidic substance of the thermochromic composition, the composition exhibits an increased effect.

It is preferable that the solvent serving as another component of the thermochromic composition be at least one member selected from the group consisting of alcohols, esters, azomethines and amides which have a boiling point of at least 150° C.

The above solvents are desirable because those having a boiling point of lower than 150° C. readily vaporize generally, therefore have difficulty in coexisting with the other two components, exhibit excessively high dissolving ability and excessively high desensitizing activity, and are objectionable.

The thermochromic composition of the present invention comprising the three components of electron-donating chromogenic material, acidic substance and solvent has the following color changing mechanism.

When the electron-donating chromogenic material and the acid substance are in such a combination that they couple relatively moderately to form a color, the two components are uncoupled by the dissolving action of the solvent when the solvent reaches a suitable temperature. By this action, coupling and uncoupling can be effected reversibly with a change of temperature, and coupling or uncoupling occurs at a temperature generally in proportion to the melting point or boiling point of the solvent in the case of solvents of the same type. Thus, uncoupling takes place to eliminate the color at a higher temperature when the solvent has a higher melting point.

The above color change mechanism is disclosed in detail in Japanese Patent Applications Nos. SHO 55-153410 and SHO 60-58481 and Japanese Utility Model Application No. SHO 58-119417 filed by the same applicants as the present application.

DESCRIPTION OF THE PREFERRED EMBODIMENTS

The solvents useful for the present invention, i.e., alcohols, esters, azomethines and amides having a boiling point of not lower than 150° C. are in common in that those boiling at higher temperatures are in a solid state. When having a higher boiling point, and a higher melting point or solidifying point, such a solid effects a color change at a higher temperature. When boiling at a lower temperature, the solid causes a color change at a lower temperature. According to the present invention, therefore, a desired color change temperature can be set within the range of from about $-40°$ C. to about 150° C. A marked reversible color change occurs below and above the set temperature.

Polyurethane foams are divided into polyether-type polyurethane foams and polyester-type polyurethane foams according to the kind of polyol (polyhydroxy compound) used as a main component. Polyurethane foams of either type are usable for this invention.

Polyether polyols are prepared, for example, by ring-opening addition polymerization from a polyhydroxyl compound, such as glycerin, trimethylolpropane, pentaerythritol, sorbitol, sucrose, ethylenediamine or diethylenetriamine, and a propylene oxide, ethylene oxide or the like, using an alkali catalyst. While any polyether-type polyol is usable, those having a hydroxyl value of up to 100 are desirable for preparing soft polyurethane foams, or those having a hydroxyl value of at least 100 are preferable for preparing rigid polyurenthane foams.

Examples of polyester-type polyols are condensation polymerization products of a dibasic acid such as adipic acid or phthalic acid and a polyhydroxy compound such as diethylene glycol, glycerin or trimethylolpropane, ring-opening polymerization product of ε-caprolactone. Any of such products is usable.

The polyisocyanate serving as another main component of polyurethane foams is an aliphatic polyisocyanate or an aromatic polyisocyanate having at least two isocyanate groups in the molecule, or a modified product of such a polyisocyanate. Examples of useful aliphatic polyisocyanates are hexamethylene diisocyanate, isophorone diisocyanate, methylcyclohexane diisocyanate and the like. Examples of useful aromatic polyisocyanates are tolylene diisocyanate (2,4- and/or 2,6-isomer), diphenyl diisocyanate, triphenyl diisocyanate, chlorophenyl-2,4-diisocyanate, p-phenyl diisocyanate, xylene diisocyanate, diphenylmethane diisocyanate, naphthalene diisocyanate, polyisocyanate obtained by reacting phosgene with a lower polycondensation product of aniline and formaldehyde, etc. Of these polyisocyanates, generally useful, inexpensive, readily available and economically advantageous are tolylene diisocyanate having a 2,4-isomer to 2,6-isomer ratio of 80:20 to 65:35 by weight, and polyisocyanate obtained by reacting phosgene with a lower polymerization product of aniline and formaldehyde.

The amount of polyisocyanate based on the combined amount of polyhydroxyl compound and other compounds having active hydrogen, i.e., isocyanate index, is preferably in the range of 80 to 130. In view of the physical properties of the urethane foam, the index is more preferably in the range of 100 to 115.

The blowing agent to be admixed with the main components is water or a low-boiling volatile liquid. Examples of useful low-boiling liquids are hydrocarbon halides such as trichloromonofluoromethane, dibromodifluoromethane, dichlorodifluoromethane, dichlorotetrafluoroethane, monochlorodifluoromethane, trifluoroethyl bromide, dichloromethane and methylene chloride. These blowing agents are usable singly or in admixture.

Examples of catalysts which are admixed with main components along with the above blowing agent are amine compounds such as triethylenediamine, N-methylmorpholine, tetramethyl-1,4-butanediamine, N-methylpiperazine, dimethylethanolamine, diethylethanolamine and triethylamine, and organic metal compounds such as stannous octoate, dibutyl tin dilaurate and dibutyl tin di-2-ethylhexoate. These catalysts are used singly, or at least two of them are used in combination. While the amount of catalyst to be used is not limited specifically but is variable over a wide range, it is usually 0.005 to 2.0 parts by weight per 100 parts by weight of the polyhydroxyl compound.

The foam stabilizer to be used conjointly with the blowing agent and catalyst is a silicone type stabilizer which is commonly used for preparing polyurethane foams. Examples of useful foam stabilizers are organosiloxane surfactants such as organosiloxane-polyoxyalkylene copolymers and polyalkenylsiloxanes having a polyoxyalkylene side chain. The stabilizer is used in an amount of 0.1 to 3.0 parts by weight, preferably 0.5 to 2.0 parts by weight, per 100 parts by weight of the polyhydroxyl compound.

When required, additives such as flame retardant, cross linking agent, antioxidant, etc. are usable in addition to the above components according to the present invention.

The thermochromic composition which is used with the above known materials for polyurethane foam and which characterizes the present invention is a mixture of three components of electron-donating chromogenic material, acidic substance and solvent as already stated.

Of these three components, the electron-donating chromogenic material governs the color and is selected from a group of heat-sensitive pressure-sensitive coloring agents which include, for example, substituted phenylmethane and fluoran derivatives such as 3,3'-dimethoxyfluoran (yellow), 3,3'-dibutoxyfluoran (yellow), 3-chloro-6-phenylaminofluoran (orange), 3-diethylamino-6-methyl-7-chlorofluoran (vermilion), 3-diethyl-7,8-benzofluoran (pink), 3,3',3"-tris(p-dimethylaminophenyl) phthalide (purplish blue), 3,3'-bis(p-dimethylaminophenyl) phthalide (green) 3-diethylamino-dibenzylaminofluoran (dark green) and 3-diethylamino-6-methyl-7-phenylaminofluoran (black), various indolyl phthalides (blue to green), spiropyrans, etc. According to the invention, these coloring agents are used singly or in admixture.

Examples of useful acidic substances, i.e., electron-accepting substances, which couple with these electron-donating chromogenic substances to form colors are phenols such as phenol, m-cresol, p-cresol, p-nonylphenol, o-phenylphenol, p-phenylphenol, styrenated phenol, p-cumylphenol, p-octylphenol, bisphenol A, β-naphthol, 1,5-dihydroxynaphthalene, resorcin, catechol, pyrogallol, phloroglucin, phloroglucide, phenolic resin oligomer, and terpolymers and octopolymers of p-chlorophenolformaldehye condensation product, lithium, sodium, calcium, magnesium, aluminum, zinc, tin, titanium, nickel and like metal salts of such phenols, hydroxy aromatic carboxylic acids and substituted derivatives thereof such as salicylic acid, p-hydroxybenzoic acid, ethyl p-hydroxybenzoate, methyl salicylate, resorcylic acid, gallic acid, butyl gallate, methylenebissalicylic acid, β-hydroxynaphthoic acid, tannic acid, β-hydroxynaphthoic acid amide, and methyl β-hydroxynaphthoate, above-mentioned metal salts of such acids or derivatives, carboxylic acids such as phthalic acid, benzoic acid, terephthalic acid, pyrromellitic acid, trimellitic acid, toluic acid, 1,2-hydroxystearic acid, oxalic acid, lauric acid, stearic acid, tartaric acid, citric acid and anthranilic acid, above-mentioned metal salts of these acids, sulfonic acids such as p-toluenesulfonic acid, sulfanilic acid, metanilic acid, 1-naphthalenesulfonic acid, 1,5-naphthalenedisulfonic acid, sulfosalicylic acid, phenolsulfonic acid, naphthionic acid, Schäffer's acid, dodecylbenzenesulfonic acid, ligninsulfonic acid, sulfonated naphthalene and formaldehyde condensation product, above-mentioned metal salts of such acids, azoles such as 5-chlorobenzotriazole, 5-butylbenzotriazole, dibenzotriazole, 4-benzotriazolesulfonic acid, benzotriazole-5-carboxylic acid, 5-hydroxybenzotriazole, 1-benzyl-5-hydroxybenzotriazole, triazoledicarboxylic acid, 1-hydroxybenzotriazole, tetrazole and hydroxybenzimidazole, esters, amides and above-mentioned metal salts of these azoles, etc. These acidic substances are used signly, or at least two of them are used in admixture. With the present invention, it is most effective to use 1,2,3-triazole among other substances.

The solvent constituting the composition and to be present conjointly with the electron-donating chromogenic material and the corresponding electron-accepting substance, i.e., acidic substance, is preferably one having a boiling point of at least 150° C. Stated more specifically, examples of useful alcohols include saturated monohydric alcohols such as octyl alcohol, nonyl alcohol, decyl alcohol, dodecyl alcohol, tetradecyl alcohol, cetyl alcohol, ocatadecyl alcohol, ceryl alcohol and myricyl alcohol, and unsaturated alcohols such as geraniol, nerol, linalool and oleyl alcohol. Examples of useful esters are lauryl stearate, lanolin, diphenyl phthalate, lauric acid glyceride, propyl laurate and palmitic acid glyceride. Examples of useful azomethines are benzylideneaniline, benzylidene p-toluidine, benzylidenestearylamine, benzylidenelaurylamine, benzylidenebutylamine, p-methoxybenzylideneaniline, p-methoxybenzylideneanisidine, p-methoxybenzylidenestearylamine, p-isopropylbenzylideneaniline, benzylidenephenylhydrazine, benzylideneethylamine, butylideneaniline, N,N-dibenzylidenebenzidine, 1,4-bisphenylazomethine, benzylidenenaphthylamine, benzylidenepicolylamine, benzylidene-6-methylpyridine and benzylidene-4-aminopyridine. Examples of useful amides are acetamide, caprylic acid amide, lauric acid amide, myristic acid amide, stearic acid amide, hydroxystearic acid amide, bisstearic acid amide, acetoacetylamide, acetanilide, p-toluenesulfoamide, benzoic acid amide, salicylic acid amide, oxalic acid amide, phthalic acid amide, phthalimide, diethylurea, thiourea, diphenylurea and benzimidazole.

Table 1 below shows examples of thermochromic compositions useful for the present invention.

TABLE 1

| Electron-donating chromogenic material | Acidic substance | Solvent | Color change temp. (°C.) |
|---|---|---|---|
| Crystal Violet lactone*[a] | 5-Butylbenzotriazole | Stearyl alcohol | 54 |
| Crystal Violet lactone | 5-Butylbenzotriazole | Lauryl palmitate | 21 |
| Crystal Violet lactone | Bisphenol A | p-Methoxybenzylidene-p-anisidine | 40 |
| Crystal Violet lactone | 1,2,3-benzotriazole Bisphenol A | Oleylamide | 65 |
| Malachite Green lactone*[b] | Tetrazole | Lauryl alcohol | −17 |
| Malachite Green lactone | Tetrazole | Butyl stearate | 10 |
| Malachite Green lactone | Bisphenol A | Benzylidene-laurylamine | 0 |
| Malachite Green lactone | Benzotriazole-5-carboxylic acid Bisphenol A | 3,6-Dimethoxy-acetoacetamide | 70 |
| 3-Diethylaminobenzofluoran*[c] | Dibenzotriazole | Cetyl alcohol | 45 |
| 3-Diethylaminobenzofluoran | Dibenzotriazole | Lauryl stearate | 25 |
| 3-Diethylaminobenzofluoran | Bisphenol A | Benzylidene-stearylamine | 28 |
| 3-Diethylaminobenzofluoran | Triazoledicarboxylic acid, Bisphenol A | Oleylamide | 65 |

*[a] brand name, purplish blue;
*[b] brand name, brilliant green;
*[c] brand name, dark pink The thermochromic compositions listed in Table 1 can be encapsulated by known methods such as interface polymerization, in situ polymerization, liquid curing-covering method, phase separation method, interface separating-out method, etc. to exhibit the foregoing outstanding effects. For example, when the interface polymerization process is resorted to, a thermochromic composition enclosed in microcapsules having a mean particle size of 10 to 40 microns can be prepared by placing the three components of electron-donating chromogenic material, acidic substance and solvent into an aqueous solution of polyvinyl alcohol along with an epoxy resin with stirring to obtain an emulsion containing oily droplets several tens of microns in size, immediately adding a curing agent to the emulsion while heating the emulsion to 80° to 90° C., and further heating the mixture at 90° to 98° C. for 2 hours. Further a composition of improved effectiveness can be prepared by the process disclosed in Japanese Patent Application No. SHO 56-131753 by the present inventors.

When required, various chemicals may be incorporated into the encapsulated composition without departing from the scope of the present invention. Examples of useful chemicals are surfactant, drying control agent, defoaming agent, resins, crosslinking agent, catalyst, viscosity adjusting agent, solvent, dye, oil-soluble coloring agent, pigment, light-accumulating pigment, fluorescent whitener, ultraviolet absorber, ultraviolet stabilizer, infrared absorber, extender pigment, blowing agent, water repellent, metal powder, wax, oil or fat, antioxidant, reduction preventing agent, electrolyte, reducing agent, oxidizer, acid, alkali, disinfectant, chelating agent, dye carrier, perfume, etc.

The polyurethane foam of the present invention is prepared by a usual process, for example, by the so-called one-shot process wherein a polyhydroxyl compound, water, catalyst, flame retardant and foam stabilizer are mixed with a polyisocyanate at the same time for reaction and foaming, or by the prepolymer process wherein a portion of the polyhydroxyl compound is reacted with the whole amount of polyisocyanate first, and the resulting prepolymer is mixed with the other components for foaming. In this case, the three components of the thermochromic composition, i.e., electron-donating chromogenic material, acidic substance and solvent are used basically in the form of an eutectic mixture, solution, encapsulated composition or individual dispersions to make them present conjointly.

The novel urethane foam of the present invention is thus obtained with widely varying soft to hard properties and is useful for various applications.

The present invention will be described with reference to the following examples, to which the invention is in no way limited. In the examples and comparative examples, the percentages are all by weight.

EXAMPLES 1 and 2, and COMPARATIVE EXAMPLE 1

Urethane foams were prepared from the components listed in Table 2 below using a foaming apparatus.

TABLE 2

| Component | Example 1 (%) | Example 2 (%) | Comp. Ex. (%) |
|---|---|---|---|
| Polyol, 3000 in molecular weight | 100 | 100 | 100 |
| Tolylene diisocyanate*[1] | 50.36 | 50.36 | 50.36 |
| Water | 3.90 | 3.90 | 3.90 |
| Triethylenediamine | 0.10 | 0.10 | 0.10 |
| L-520*[2] | 1.20 | 1.20 | 1.20 |

TABLE 2-continued

| Component | Example 1 (%) | Example 2 (%) | Comp. Ex. (%) |
|---|---|---|---|
| Stannous octoate | 0.50 | 0.50 | 0.40 |
| Trichloromonofluoromethane | 3.00 | 3.00 | 3.00 |
| Chromic Color S-37 Turquoise Blue #1 | 7.50 | — | — |
| Chromic Color S-37 Magenta #2 | — | 7.50 | — |
| Glow Yellow MF2G #3 | 1.00 | 1.00 | 1.00 |

*[1] 2,4-isomer/2,6-isomer = 80/20
*[2] Brand name for polyalkylsiloxane-polyoxyethylene/polyoxypropylene copolymer
1 Brand name for thermochromic particles
2 Brand name for thermochromic particles
3 Brand name for fluorescent pigment Table 3 shows the properties of the thermochromic polyurethane foams obtained.

TABLE 3

| Item | Example 1 | Example 2 | Comp. Ex. |
|---|---|---|---|
| Density (g/cm$^3$) | 0.0251 | 0.0249 | 0.0240 |
| 25% Hardness (kgf) | 10.6 | 10.9 | 11.2 |
| Elongation (%) | 164 | 172 | 180 |
| Tensile strength (kg/cm$^2$) | 1.08 | 1.04 | 1.12 |

The results given in Table 3 show that the presence of the thermochromic composition in no way impairs the properties of the polyurethane foam.

The foams obtained were immersed in warm water having a temperature of about 40° C. and checked for a color change, with the results given in Table 4.

TABLE 4

| | At room temp. (25° C.) ⇌ In warm water (40° C.) | | |
|---|---|---|---|
| Example 1 | Brilliant green | ⇌ | Brilliant yellow |
| Example 2 | Brilliant red | ⇌ | Brilliant yellow |
| Comp. Ex. | Remaining brilliant yellow | | |

Table 4 shows that although the foam of the Comparative Example remains brilliant yellow without any color change, the foams of Examples 1 and 2 distinctly exhibit a reversible color change. The results of Tables 3 and 4 indicate that the polyurethane foams of the present invention were in no way affected by the chemical reaction during preparation and nevertheless have thermochromic properties.

EXAMPLES 3 and 4

Polyurethane foams were prepared from the components listed in Table 5 in the same manner as in Examples 1 and 2 using a foaming apparatus.

TABLE 5

| Component | Example 3 (%) | Example 4 (%) |
|---|---|---|
| Polyol, 3000 in molecular weight | 100 | 100 |
| Tolylene diisocyanate*[1] | 44.20 | 44.20 |
| Water | 3.00 | 3.00 |
| Triethylenediamine | 0.12 | 0.12 |
| L-520 | 1.00 | 1.00 |
| Stannous octoate | 0.30 | 0.30 |
| Chromic Color S-37 Pink #4 | 5.00 | 15.00 |
| Cyanine Blue LBS #5 | 1.00 | 1.00 |

*[1] 2,4-isomer/2,6-isomer = 80/20
4 Brand name for thermochromic particles
5 Brand name for phthalocyanine pigment Table 6 shows the properties of the foams obtained.

TABLE 6

| Item | Example 3 | Example 4 |
|---|---|---|
| Density (g/cm$^3$) | 0.0315 | 0.0330 |
| 25% Hardness (kgf) | 11.8 | 11.6 |
| Elongation (%) | 198 | 170 |
| Tensile strength (kg/cm$^2$) | 1.28 | 1.20 |

The foams were immersed in warm water at about 40° C. and checked for a color change as in Examples 1 and 2. Table 7 shows the results.

Tables 6 and 7 thus indicate the effects of the polyurenthane foams of the invention.

TABLE 7

| | At room temp. (25° C.) ⇌ In warm water (40° C.) | | |
|---|---|---|---|
| Example 3 | Purple | ⇌ | Blue |
| Example 4 | Dark purple | ⇌ | Blue |

EXAMPLES 5 and 6

In the same manner as in Examples 1 to 4, urethane foams were prepared according to the formulation given in Table 8, using a polyester polyol as the polyol and a foaming machine.

TABLE 8

| Component | Example 5 (%) | Example 6 (%) |
|---|---|---|
| Dn 2200*[3] | 100 | 100 |
| Tolylene diisocyanate*[4] | 43.59 | 52.00 |
| Water | 3.4 | 3.9 |
| N—Ethylmorpholine | 2.0 | 2.1 |
| L-532*[5] | 1.5 | 1.45 |
| Chromic Color S-37 Black #6 | 5.00 | — |
| Chromic Color S-37 Turquoise Blue #1 | — | 5.00 |
| Diaresin Red G #7 | 1.00 | 1.00 |

*[3] Brand name for condensation product of adipic acid, diethylene glycol and trimethylolpropane
*[4] 2,4-isomer/2,6-isomer = 65/35
*[5] Brand name for polyalkylsiloxane-polyoxy-alkylene copolymer
1 Brand name for thermochromic particles
6 Brand name for thermochromic particles
7 Brand name for oil-soluble dye Table 9 shows the properties of the foams obtained.

TABLE 9

| Item | Example 5 | Example 6 |
|---|---|---|
| Density (g/cm$^3$) | 0.0312 | 0.0273 |
| 25% Hardness (kgf) | 18.3 | 16.7 |
| Elongation (%) | 215 | 207 |
| Tensile strength (kg/cm$^2$) | 1.78 | 1.85 |

The foams were immersed in warm water at about 40° C. Table 10 below shows the resulting color change.

TABLE 10

| | At room temp. (25° C.) ⇌ In warm water (40° C.) | | |
|---|---|---|---|
| Example 5 | Dark brown | ⇌ | Red |
| Example 6 | Purple | ⇌ | Red |

The above results indicate that the use of polyester polyol also affords polyurethane foams of the invention which retain the desired properties and thermally undergo a reversible color change.

As will be apparent from the foregoing description, the polyurethane foam of the invention has outstanding thermochromic properties and yet possesses the properties desirable for polyurethane foams. The product is therefore useful for a wide variety of articles as mentioned below and has outstanding industrial usefulness.

Examples of uses (1) Toys . . . bathing toys, and balls, toys, etc. having a color which changes with a change of atmospheric temperature.
(2) Ornaments . . . with different colors in different seasons.
(3) Temperature sensors . . . for use in living rooms and compartments of vehicles.
(4) Cleaners . . . for use in kitchens and baths.
(5) Filters . . . adapted for detecting an abnormal temperature of penetrating gas or liquid.
(6) Soundproof materials.
(7) Heat insulating materials.
(8) Hydroponic materials . . . for detecting the temperature of water.
(9) Cores for heater-incorporating carpets.

What is claimed is:

1. A thermochromatic polyurethane foam characterized in that the foam comprises a polyol and a polyisocyanate as main components, and a thermochromic composition serving as a coloring agent and added to the main components singly or conjointly with a usual dye or pigment, the thermochromic composition comprising an electron-donating chromogenic material, an acidic substance and a solvent.

2. A thermochromic polyurethane foam as defined in claim 1 wherein the electron-donating chromogenic material, the acidic substance and the solvent are conjointly enclosed in microcapsules to serve as the thermochromic composition.

3. A thermochromic polyurethane foam as defined in claim 1 wherein the acidic substance is a 1,2,3-triazole.

4. A thermochromic polyurethane foam as defined in claim 1 wherein the solvent is at least one member selected from the group consisting of alcohols, esters, azomethines and amides and having a boiling point of at least 150° C.

5. A thermochromic polyurethane foam as defined in claim 1 which comprises the thermochromic composition in an amount of 1 to 50 parts by weight per 100 parts by weight of the polyol.

6. A thermochromatic polyurethane foam comprising a polyol and a polyisocyanate as main components, and a thermochromic composition serving as a coloring agent and added to the main components at least singly, and at least one of a dye and a pigment, the thermochromic composition comprising an electron-donating chromogenic material, an acidic substance and a solvent.

7. A thermochromic polyurethane foam according to claim 6, including microcapsules enclosing the electron-donating chromogenic material, the acidic substance and the solvent to serve as the thermochromic composition.

8. A thermochromic polyurethane foam according to claim 7, wherein the acidic substance is a 1,2,3-triazole.

9. A thermochromic polyurethane foam according to claim 8, wherein the solvent is at least one member selected from the group consisting of alcohols, esters, azomethines and amides and having a boiling point of at least 150° C.

10. A thermochromic polyurethane foam according to claim 9, which comprises the thermochromic composition in an amount of 1 to 50 parts by weight per 100 parts by weight of the polyol.

11. A method of making a thermochromic polyurethane foam comprising combining polyol and polyisocyanate as main components, with a thermochromic composition serving as a coloring agent and added to the main components singly or conjointly with at least one of dye and pigment, the thermochromic composition comprising an electron-donating chromogenic material, an acidic substance and a solvent.

12. A method according to claim 11, including microcapsulating the thermochromic composition.

13. A method according to claim 11, wherein the solvent is selected to have a boiling point of at least 150° C.

* * * * *